United States Patent [19]

Shibasaki et al.

[11] 4,334,269
[45] Jun. 8, 1982

[54] DATA PROCESSING SYSTEM HAVING AN INTEGRATED STACK AND REGISTER MACHINE ARCHITECTURE

[75] Inventors: Yoshihisa Shibasaki, Sayama; Ken Sakamura, Tokyo; Waichi Sakamae, Tokyo; Koichi Nakano, Tokyo; Hideo Aiso, Yokohama, all of Japan

[73] Assignees: Panafacom Limited, Yamato; High Level Machines Corp., Tokyo, both of Japan

[21] Appl. No.: 92,859

[22] Filed: Nov. 9, 1979

[30] Foreign Application Priority Data

Nov. 20, 1978 [JP] Japan .............................. 53-143101

[51] Int. Cl.³ ........................ G06F 9/34; G06F 13/00
[52] U.S. Cl. ................................................ 364/200
[58] Field of Search ... 364/200 MS File, 900 MS File

[56] References Cited

U.S. PATENT DOCUMENTS 3,614,741 10/1971 McFarland ...................... 364/200
3,737,871 6/1973 Katzman ......................... 364/200
3,810,117 7/1974 Healey ............................ 364/200
3,952,289 4/1976 Baligant .......................... 364/200
3,959,777 5/1976 Kimmel .......................... 364/900
4,121,286 10/1978 Venton et al. ................... 364/900
4,138,732 2/1979 Suzuki ............................ 364/900

*Primary Examiner*—Harvey E. Springborn
*Attorney, Agent, or Firm*—Staas & Halsey

[57] ABSTRACT

A data processing system includes three resources, i.e., a memory, a general purpose register file having a plurality of elements and a stack having a top. The system further includes a first mechanism for making the top of the stack correspond to at least one of the elements in the general purpose register and a second mechanism for controlling the operation of the stack. When the element to which the top of the stack corresponds is specified in an instruction register of the system, the top of the stack is selected to be accessed by the first mechanism and the operation of the stack is controlled by the second mechanism.

7 Claims, 10 Drawing Figures

| ADDRESS PART | | | | ELEMENT TO BE SELECTED | |
|---|---|---|---|---|---|
| 3 | 2 | 1 | 0 | FLAG = "0" | FLAG = "1" |
| 0 | 0 | 0 | 0 | ↑↓ TOS ($R_0$) | TOS ($R_0$) |
| 0 | 0 | 0 | 1 | $R_1$ | $R_1$ |
| 0 | 0 | 1 | 0 | $R_2$ | $R_2$ |
| 0 | 0 | 1 | 1 | $R_3$ | $R_3$ |
| 0 | 1 | 0 | 0 | $R_4$ | $R_4$ |
| 0 | 1 | 0 | 1 | $R_5$ | $R_5$ |
| 0 | 1 | 1 | 0 | $R_6$ | $R_6$ |
| 0 | 1 | 1 | 1 | $R_7$ | $R_7$ |

| OP CODE | OPERAND SPECIFIER 1 | OPERAND SPECIFIER 2 |
|---|---|---|

Fig. 6

| ADDRESS PART | | | | ELEMENT TO |
|---|---|---|---|---|
| 3 | 2 | 1 | 0 | BE SELECTED |
| 0 | 0 | 0 | 0 | ↕ TOS ($R_0$) |
| 0 | 0 | 0 | 1 | TOS ($R_1$) |
| 0 | 0 | 1 | 0 | $R_2$ |
| 0 | 0 | 1 | 1 | $R_3$ |
| 0 | 1 | 0 | 0 | $R_4$ |
| 0 | 1 | 0 | 1 | $R_5$ |
| 0 | 1 | 1 | 0 | $R_6$ |
| 0 | 1 | 1 | 1 | $R_7$ |

Fig. 8

| 3 | 2 | 1 | 0 |
|---|---|---|---|
| CSI ||||

|  | CSI |  |  |  | ELEMENT TO BE |
|---|---|---|---|---|---|
|  | 3 | 2 | 1 | 0 | CONNECTED TO TOS |
| CONNECT MODE (0) | 0 | 0 | 0 | 0 | $R_0$ |
|  | 0 | 0 | 0 | 1 | $R_1$ |
|  | 0 | 0 | 1 | 0 | $R_2$ |
|  | 0 | 0 | 1 | 1 | $R_3$ |
|  | 0 | 1 | 0 | 0 | $R_4$ |
|  | 0 | 1 | 0 | 1 | $R_5$ |
|  | 0 | 1 | 1 | 0 | $R_6$ |
|  | 0 | 1 | 1 | 1 | $R_7$ |
| DISCONNECT MODE (1) | 1 | 0 | 0 | 0 | $R_0$ * |
|  | 1 | 0 | 0 | 1 | $R_1$ * |
|  | 1 | 0 | 1 | 0 | $R_2$ * |
|  | 1 | 0 | 1 | 1 | $R_3$ * |
|  | 1 | 1 | 0 | 0 | $R_4$ * |
|  | 1 | 1 | 0 | 1 | $R_5$ * |
|  | 1 | 1 | 1 | 0 | $R_6$ * |
|  | 1 | 1 | 1 | 1 | $R_7$ * |

Fig. 10

| CSI(1) 2 | CSI(1) 1 | CSI(1) 0 | CSI(2) 2 | CSI(2) 1 | CSI(2) 0 | ELEMENT TO BE CONNECTED TO TOS | ELEMENT TO BE CONNECTED TO ↑↑TOS |
|---|---|---|---|---|---|---|---|
| 0 | 0 | 0 | 0 | 0 | 1 | $R_0$ | $R_1$ |
| 0 | 0 | 0 | 0 | 1 | 0 | $R_0$ | $R_2$ |
| 0 | 0 | 0 | 0 | 1 | 1 | $R_0$ | $R_3$ |
| 0 | 0 | 0 | 1 | 0 | 0 | $R_0$ | $R_4$ |
| 0 | 0 | 0 | 1 | 0 | 1 | $R_0$ | $R_5$ |
| 0 | 0 | 0 | 1 | 1 | 0 | $R_0$ | $R_6$ |
| 0 | 0 | 0 | 1 | 1 | 1 | $R_0$ | $R_7$ |
| 0 | 0 | 1 | 0 | 0 | 0 | $R_1$ | $R_0$ |
| 0 | 0 | 1 | 0 | 1 | 0 | $R_1$ | $R_2$ |
| 0 | 0 | 1 | 0 | 1 | 1 | $R_1$ | $R_3$ |
| 0 | 0 | 1 | 1 | 0 | 0 | $R_1$ | $R_4$ |
| 0 | 0 | 1 | 1 | 0 | 1 | $R_1$ | $R_5$ |
| 0 | 0 | 1 | 1 | 1 | 0 | $R_1$ | $R_6$ |
| 0 | 0 | 1 | 1 | 1 | 1 | $R_1$ | $R_7$ |
| 0 | 1 | 0 | 0 | 0 | 0 | $R_2$ | $R_0$ |
| 0 | 1 | 0 | 0 | 0 | 1 | $R_2$ | $R_1$ |
| 0 | 1 | 0 | 0 | 1 | 1 | $R_2$ | $R_3$ |

DATA PROCESSING SYSTEM HAVING AN INTEGRATED STACK AND REGISTER MACHINE ARCHITECTURE

BACKGROUND OF THE INVENTION

This invention relates to a data processing system and more particularly to a data processing system capable of performing logical and arithmetic operations on data stored in a main memory, a general purpose register file and/or a stack.

In prior art data processing systems, there are two types of computer architectures; i.e., a stack machine using a stack to perform operations and a register machine using a general purpose register file to perform operations.

A stack machine has a main memory and a stack as its resources and perfomes operations on data stored in the main memory and/or the stack. The stack comprises a plurality of elements, the size of each element being of a fixed word length. One of these elements is pointed by a stack pointer (SP). The element pointed by the SP is called a Top of the Stack (TOS). Writing data from the memory to the stack or reading data from the stack to the memory can only be executed at the TOS mentioned above in accordance with the so called "Last In First Out" (LIFO) principle. Operations on data stored in the stack can only be performed on data in the TOS and data stored in the element next to the TOS.

A register machine has, as its resources, a main memory and a general purpose register file, and performs operations on data stored in the main memory and/or the general purpose register file. The general purpose register file also has a plurality of elements, the size of each element being of a fixed word length.

The characteristics of the stack machine and those of the register machine are complementary, due to the above-mentioned structure of these machines.

The stack machine is advantageous in the field of the evaluation of arithmetical and logical expressions and can easily and efficiently evaluate the expressions. This is because the stack machine dynamically and automatically allocates the main memory, so that only the minimum number of storage locations are used. In addition, although all modern compilers for register machines first (either implicity or explicity) translate any arithmetic or logical expression into reverse-polish notation and then into machine language, compilers for stack machines do not have to perform the second translation, since the reverse-polish notation exactly corresponds to the sequence of the required stack machine instructions.

In contrast to this, the compilers for register machines have to perform the second translation from reverse-polish notation into the required register machine instructions. The optimization during the second translation depends on the architecture such as the number of the elements of the register file so that efficient generation of machine language is difficult.

The stack machine is also suitable for program sequence control, for example a dynamic reservation of a temporary area and a dynamic release of the reserved temporary area, and a call operation of a subprogram or a program interrupt. This is because the stack machine does not need to prereserve any area for a program to be called and can store the called program into the stack at any required moment during a dynamic allocation, and because the contents stored in the stack are not destroyed upon writing. In contrast, the register machine is not suitable for program sequence control, since the register machine needs to reserve storage areas for dynamic allocation, and the contents stored in the register are destroyed upon writing.

However, the stack machine generally has the following disadvantages. The first disadvantage is that the number of steps for performing an operation in the stack machine is greater than that in the register machine. For example, if an operation for adding the data A and B stored in the memory is performed, the stack machine requires three steps; i.e., PUSH A, PUSH B and ADD, whereas the register machine requires no more than two steps; i.e., LOAD A, ADD B. The second disadvantage of the stack machine is that the operating speeds are very low compared to the register machine. This is because the stack machine is equivalent to a machine having only one accumulator, since operations on data stored in the stack can only be performed between data stored in the TOS and data stored in the element next to the TOS, as described above. In contrast with the stack machine, the register machine is able to rapidly access any element in the general purpose register file, and therefore the operating speeds are very high compared to the stack machine. Thus, the architecture which is most suitable for operation and addressing is the register machine rather than the stack machine.

In the prior art, the stack machine and the register machine have different architectures having complementary characteristics as mentioned above. In the stack machine, there can be three types of transfer instructions, as follows:

$$M_i \leftarrow M_j$$

$$\downarrow TOS \leftarrow M_i$$

$$M_i \leftarrow \uparrow TOS$$

and one type of dyadic operation instruction, as follows:

$$\uparrow TOS \cdot \uparrow TOS \rightarrow \downarrow TOS$$

where (and hereinafter,) $M_i$ and $M_j$ are operands of the i-th and j-th elements, respectively, in the main memory, $\downarrow TOS$ denotes the push down operation into the stack, $\uparrow TOS$ denotes the pop up operation from the stack, and the dots between operands in the dyadic operation instructions denote arithmetic or logical operations. In the register machine, there can be four types of transfer instructions, as follows:

$$R_1 \leftarrow R_j$$

$$R_i \leftarrow M_j$$

$$M_i \leftarrow R_i$$

$$M_1 \leftarrow M_j$$

and six types of dyadic operation instructions, as follows:

$$\begin{pmatrix} R_i \cdot R_j \\ R_i \cdot M_j \\ M_i \cdot M_j \end{pmatrix} \longrightarrow \begin{pmatrix} R_k \\ M_k \end{pmatrix}$$

where and hereinafter, $R_i$, $R_j$ and $R_k$ are operands of i-th, j-th and k-th elements, respectively, in the general purpose register file. Both machines have instructions of two-address format.

Now, consider a "composite" machine made by simply combining the stack machine and register machine which will have the advantages of both the stack machine and the register machine. The "composite" machine must have three resources; i.e., a main memory, a general purpose register file and a stack.

In order to utilize these resources effectively, a large number of instructions may be required as follows. There may be twelve transfer instructions required, as follows:

$$R_i \leftarrow R_j$$

$$R_i \leftarrow M_j$$

$$R_i \leftarrow TOS$$

$$R_i \leftarrow \uparrow TOS$$

$$M_i \leftarrow R_j$$

$$M_i \leftarrow M_j$$

$$M_i \leftarrow TOS$$

$$M_i \leftarrow \uparrow TOS$$

$$TOS \leftarrow R_i$$

$$TOS \leftarrow M_i$$

$$\downarrow TOS \leftarrow R_i$$

$$\downarrow TOS \leftarrow M_i$$

and there may be thirty two (8×4) dyadic operation instructions, as follows:

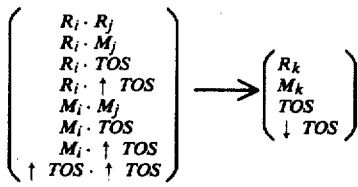

where the expression "TOS" without an arrow means the top of the stack when the stack is utilized as a usual register without stack operation. Thus, in the "composite" machine made by combining the register machine and the stack machine, the number of instructions is greater than that required in the register machine alone or the stack machine alone. In addition the number of the locations for storing the results of operations is increased. Further, the "composite" machine has the disadvantages of a complicated instruction set an increased memory area (since the instruction format is either a three-address format or both two-address and three-address formats), and the size of the instruction is increased. Therefore, the throughput of the "composite" machine is low and the "composite" machine is not adaptable to practical use.

SUMMARY OF THE INVENTION

A principal object of the present invention is to obtain high throughput of a data processing system having three resources, i.e., a main memory, a general purpose register file and a stack.

Another object of the present invention is to provide the above-mentioned data processing system in which the number of instructions is reduced and the instruction set is simplified.

BRIEF DESCRIPTION OF THE DRAWING

These and other objects and advantages of the present invention may best be understood by reference to the following detailed description of illustrative embodiments and the accompanying drawings, wherein.

Figure 5:
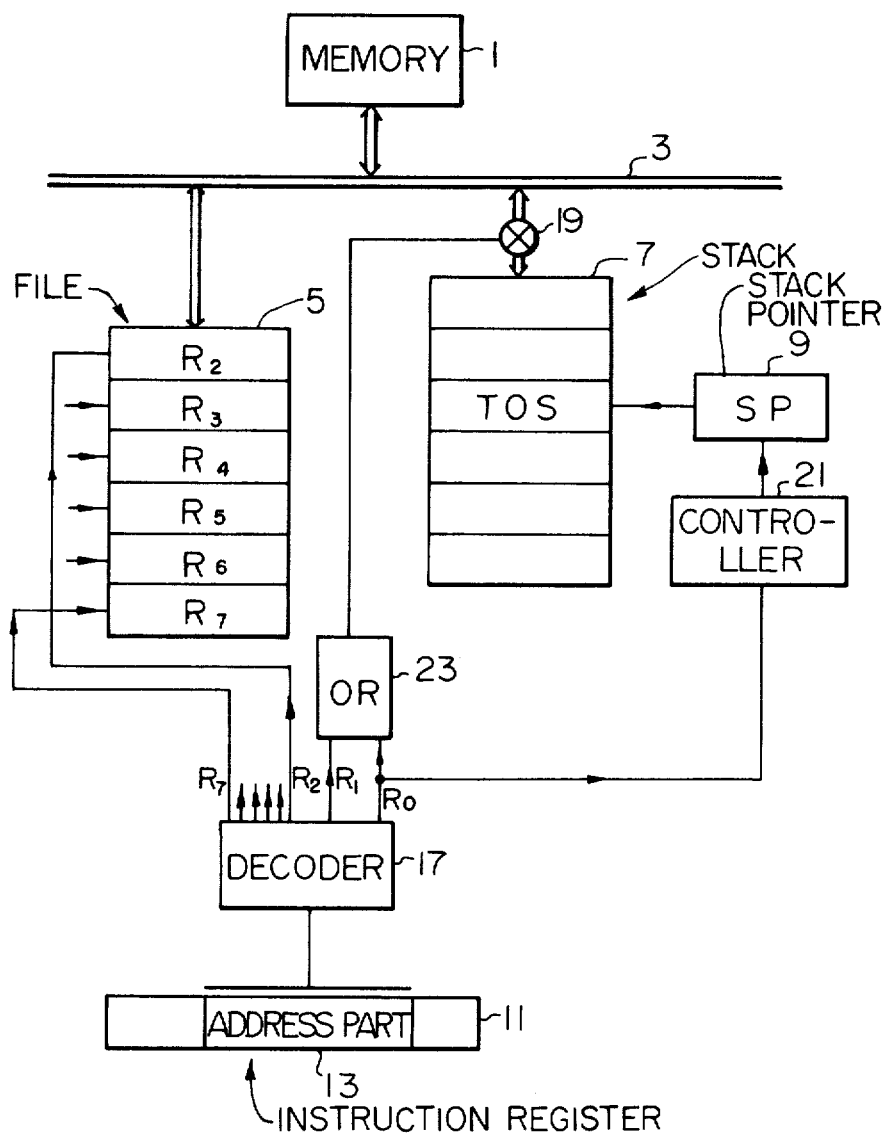
Figure 7:
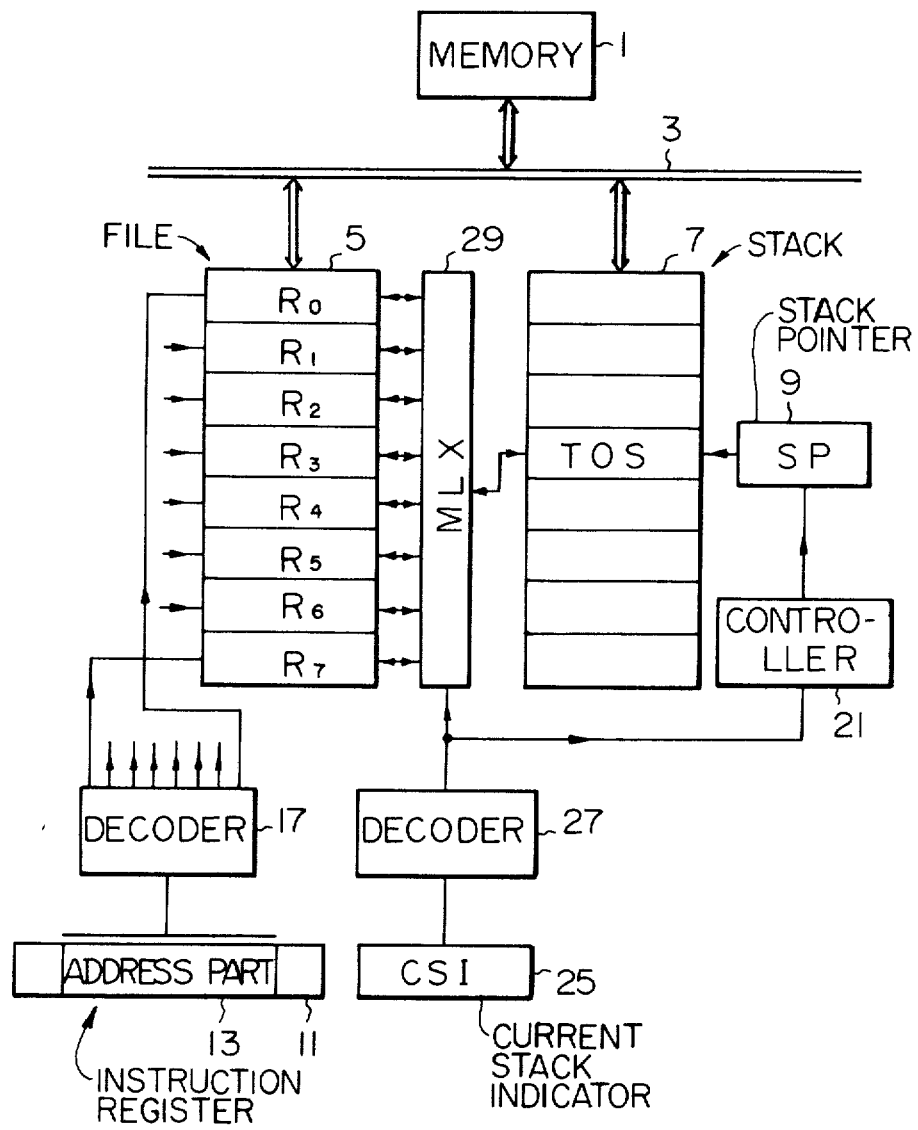
Figure 9:
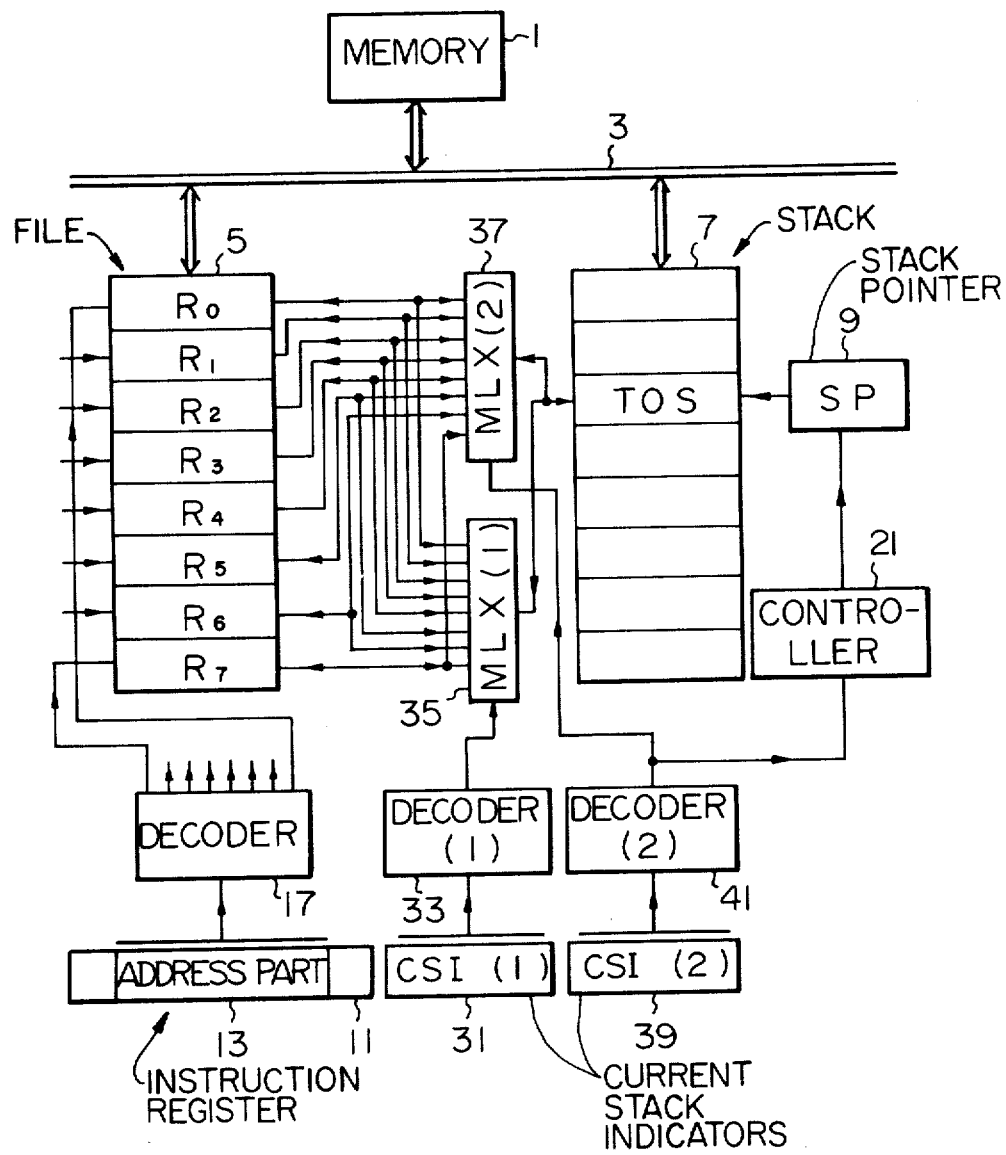

is calculated;

FIG. 5 illustrates a block diagram of a data processing system in accordance with another embodiment of the present invention;

FIG. 6 is a table showing addressing of elements which may be used in the system of FIG. 5;

FIG. 7 illustrates a block diagram of a data processing system in accordance with still another embodiment of the present invention;

FIG. 8 is a table showing addressing of elements which may be used in the system of FIG. 7;

FIG. 9 illustrates a block diagram of a data processing system in accordance with a still further embodiment of the present invention; and FIG. 10 is a table showing addressing of elements which may be used in the system of FIG. 9.

PREFERRED EMBODIMENTS OF THE INVENTION

Figure 1:
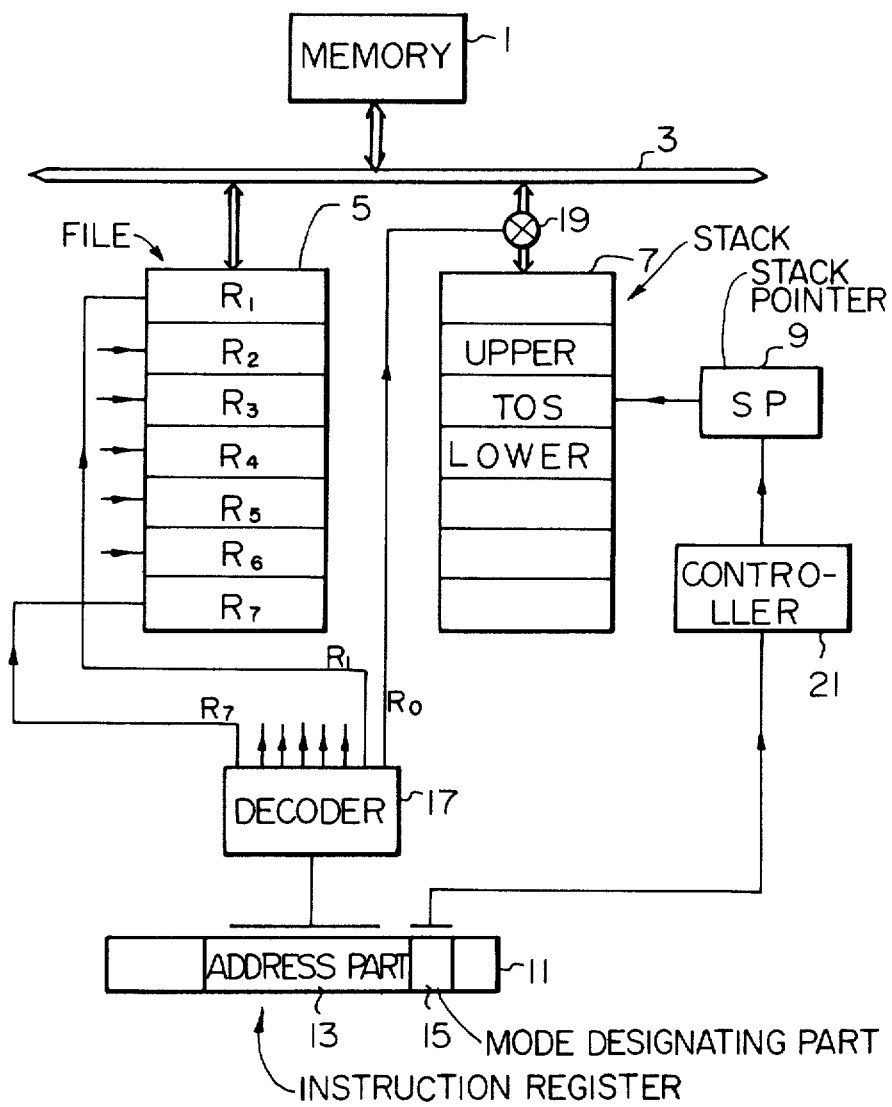
FIG. 1 illustrates a block diagram of a data processing system, in accordance with an embodiment of the present invention.
Figures 2, 3, 4:
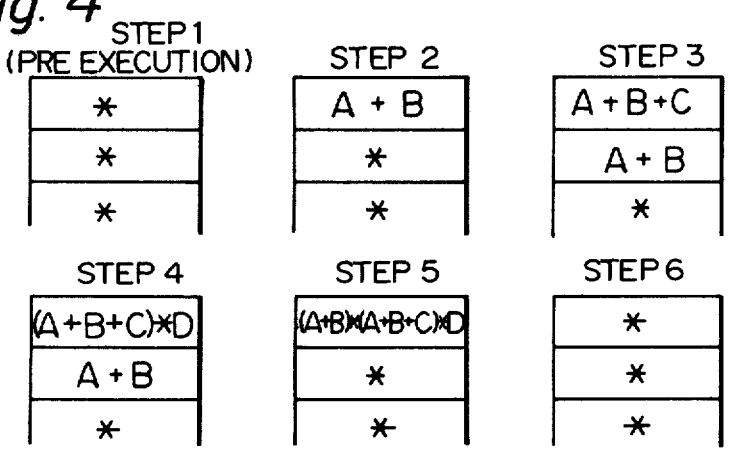
FIG. 2 is a table showing addressing of elements which may be used in the system of FIG. 1.
FIG. 3 illustrates a basic instruction format used in a data processing system of the present invention.
FIG. 4 illustrates the change of contents of the stack in the system of FIG. 1 when the expression $$E = (A+B)*(A+B+C)*D$$

Referring now to FIG. 1, the data processing system of this embodiment includes a main memory 1, which is one of the resources of the system, connected to a main bus 3 in a processing unit (not shown). The system also includes a general purpose register file 5, which is another resource of the system, connected to the main bus 3. In this embodiment of FIG. 1, the register file 5 has seven elements $R_1$ through $R_7$. The system further includes a stack 7, which is yet another resource of the system, also connected to the main bus 3. The top of the stack 7 (TOS) acts, in this embodiment, as an element $R_0$ (not shown) in the general purpose register file 5 and is pointed by a stack pointer (SP) 9. The stack pointer 9 is controlled by a controller 21 which is connected to a mode designating part 15 in an instruction register 11. The instruction register 11 includes an operation code, and two operand specifiers. Each operand specifier includes an address part 13 for storing an address of one of the elements $R_0$ through $R_7$ to be accessed, and the mode designating part 15 for specifying either a disconnect mode or a connect mode. For simplicity, only one address part 13 is illustrated in FIGS. 1, 7 or 9, however, it should be noted that there are two address parts, one for each of the operand specifiers, as illustrated in FIG. 3. When the disconnect mode is specified in the operand specifier, the contents of the stack pointer 9 are not changed even when the TOS of the stack is accessed. In other words, in the disconnect mode, the stack acts as the element $R_0$ of the register file 5. While, when the connect mode is specified in the operand specifier, the contents of the stack pointer 9 are changed when the TOS is accessed, and the stack acts as a stack itself. The address part 13 of the instruction register 11 is connected to a decoder 17 which decodes the binary codes from the address part 13 to designate one element of the elements $R_0$ through $R_7$. If the result of decoding by the decoder 17 is to designate the element $R_0$, a switch 19 connected between the main bus 3 and the stack 7 is activated by the signal from the decoder 17, so that, the TOS is connected to the main bus 3. The stack transfers data to or from a processing unit (not shown) through the main bus 3. While, if the result of decoding is to designate one element of the elements $R_1$ through $R_7$, the designated element in the general purpose register file 5 is accessed.

The operation of the data processing system of FIG. 1 is as follows:

In the embodiment of FIG. 1, the address part 13 includes four bits; i.e., bit 3 through bit 0 as shown in FIG. 2. When the value of the bit 3 in the address part is "0", bit 2 through bit 0 specifies one of the elements TOS (RO) $R_0$ through $R_7$. When the value of the bit 3 is "1", bit 2 through bit 0 specifies an addressing mode for accessing the main memory 1. To avoid redundancy, FIG. 2 only shows the case where the value of the bit 3 is "0". In FIG. 2, when the value of the bits 2 through 0 is "000", the element TOS ($R_0$) is specified to be accessed and, since the element TOS ($R_0$) is made to correspond to the TOS of the stack 7 which the stack pointer 9 points, the TOS is actually selected to be accessed. In this case, when the flag in the mode designating part 15 is "0", the connect mode is selected. In the connect mode of operation, the selected TOS acts as a stack. In other words, when data is written in the TOS or the TOS is used as a destination, the contents of the stack pointer 9 are changed to point the upper element next to the original TOS (FIG. 1) and the element pointed by the stack pointer 9 becomes a new TOS. Taking the new TOS as a reference point, the original TOS is pushed down with respect to the new TOS. The above mentioned operation of writing data in the stack is generally called a push down operation. While, when data is read from the TOS or the TOS is used as a source, the contents of the stack pointer 9 are changed to point to the lower element next to the original TOS (FIG. 1) and the element pointed by the stack pointer 9 becomes a new TOS. The above mentioned operation of reading data from the stack is generally called a pop up operation.

When the flag in the mode designating part 15 is "1", the disconnect mode is selected. In the disconnect mode, the TOS selected by the value "000" of the bits 2 through 0 acts as the element $R_0$ of the general purpose register file without a stack operation, thus the controller 21 (FIG. 1) does not change the contents of the stack pointer 9 and writing data into the TOS is destructive.

In FIG. 2, it will be understood that when the value of the bits 2 through 0 in the address part 13 is one of the values "001" through "111", the selected element to be accessed is one of the elements $R_1$ through $R_7$, respectively.

According to the embodiment of a data processing system shown in FIG. 1, since the TOS of the stack corresponds to the element $R_0$, three resources, i.e., the main memory 1, the general purpose register file 5 and the stack 7, can be accessed as two resources, i.e., the main memory 1 and the general purpose register file 5. Therefore, in spite of the fact that three resources are present, the number of instructions required in the data processing system of the present embodiment can be reduced to the same number as is required in the register machine alone. In addition, a two-address format can be employed as an instruction format in the system of the present embodiment. The effects obtained by the data processing system of FIG. 1 will be further described in detail in conjunction with FIG. 3 and FIG. 4. FIG. 3 shows a basic format of the instruction used in the data processing system of the present invention, wherein the "OP code" specifies a particular operation to be performed and the "Operand Specifier 1" and "Operand Specifier 2" specify addresses of the first and second operands, respectively. The result of an operation, such as addition or subtraction specified by the "OP code" is, according to the present invention, pushed down into the stack, so that a reduced number of instructions and a two-address format can be realized with nondestructive writing-in.

For instance, when an instruction such as

ADD $R_2$, $R_3$ is to be performed, the data processing system of FIG. 1 performs the operation $\downarrow$ TOS←$R_2$+$R_3$.

That is, the operation of add and push down is executed by a single instruction having a two-address format and, since the result of the operation is pushed down into the stack, the writing operation is nondestructive. In contrast, the aforementioned "composite" machine made simply by combining the stack machine with the register machine would require three instructions such as

PUSH $R_2$, TOS

PUSH $R_3$, TOS

ADD TOS, TOS for performing the above mentioned operation using a two-address format. Thus the number of instructions would be increased by two compared with that required in the present invention. To perform the above operation in one instruction in the "composite" machine, a three-address format instruction would be required, such as ADD $R_2$, $R_3$, TOS.

Consider now an operation of calculating the expression:

$$E=(A+B)*(A+B+C)*D$$

by using the data processing system of FIG. 1, and referring to FIG. 4, where the notations A, B, C, D and E denote data stored in the main memory 1 or the general purpose register file 5 (FIG. 1). At first, the operation ADD A, B is executed and the result is pushed down into the top of the stack, as shown in the STEP2 of FIG. 4. Since the top of the stack corresponds to the element $R_0$ in the register file 5, the address for specifying the TOS is $R_0$. Therefore, the next instruction to be performed is ADD $R_0$, C, in a state of the flag of the mode designating part 15 being "1". As a result of this operation, the data A+B+C is pushed down into the top of the stack and the previous data A+B remains nondestructively in the lower element next to the TOS as shown in the STEP3 of FIG. 4. The third instruction to be performed is MULTIPLY $R_0$, D, in a state of the flag of the mode designating part 15 being "0". As a result of this, the data A+B+C, which is the content of the element $R_0$ or of the top of the stack, is popped up. After the pop up operation, the state of the stack is returned to the state shown in the STEP2 of FIG. 4. Then, the popped up data (A+B+C) is multiplied by the data D in the processing unit (not shown) and the result of the multiplication is pushed down into the stack. As a result of this operation, the data (A+B+C)*D is present in the top of the stack and the data (A+B) remains in the lower element next to the TOS as shown in the STEP4 of FIG. 4. The fourth instruction to be performed is MULTIPLY $R_0$, $R_0$, in the state of the flag of the mode designating part 15 being "0". As a result of this operation, the data stored in the stack as shown in the STEP4 of FIG. 4 are serially popped up, then the popped up data are multiplied by each other and the result of the multiplication is pushed down into the TOS as shown in the STEP5 of FIG. 4. The last instruction to be performed is MOVE $R_0$, E, in the state of the flag of the mode designating part being "0". As a result of this operation, the data (A+B)*(A+B+C)*D, which is the content of the TOS, is popped up and then transferred to the element E in the general purpose register file 5 or the main memory 1.

From the foregoing description, it will be understood that, according to the first embodiment of the present invention, the following advantages can be obtained:

(1) operations on data stored in the stack, the general purpose register file and/or the main memory can be performed uniformly with a reduced number of instructions;

(2) since there is no resource whose contents are destroyed upon writing and the stack is equivalent to a temporary register, a temporary storing operation in or a return operation to the general purpose register is not needed during any operation, thus a high activity ratio for the general purpose register is obtained;

(3) the instruction set is simplified because instructions having only a two-address format are required in the present embodiment and instructions having a three-address format, as required in the prior art register machine, are not required.

In the embodiment of FIG. 1, the element $R_0$ in the register file is made to correspond to the TOS of the stack, but it is to be understood that any other element may be made to correspond to the TOS. Also, the general purpose register file 5 has seven elements, i.e., $R_1$ through $R_7$, in the embodiment of FIG. 1, but greater or a lesser number of elements can be incorporated in the register file.

FIG. 5 is a block diagram of a data processing system, according to another embodiment of the present invention. The data processing system of FIG. 5 is similar to that of FIG. 1, and the only difference which exists is that the mode designating part 15 (FIG. 1) is not used in FIG. 5. Instead, the TOS of the stack 7 acts as two elements ($R_0$ and $R_1$) of the general purpose register file 5 by the address part 13. In the embodiment of FIG. 5, the elements $R_0$ and $R_1$ are made to correspond to the TOS. When the element $R_0$ is specified in the address part 13, the decoder 17 decodes the address code of the element $R_0$ to energize the line "$R_0$" on the output of the decoder. Since the energized line "$R_0$" is connected through an OR circuit 23 to the switch circuit 19, the decoded signal on the line "$R_0$" activates the switch circuit 19, so that, in place of the element $R_0$, the TOS in the stack 7 is connected to the main bus 3. The TOS transfers data to or from a processing unit (not shown) connected to the main bus 3. At the same time, the decoded signal on the line "$R_0$" is transmitted to the controller 21 to control the contents of the stack pointer 9 in the connect mode of operation. On the other hand, when the element $R_1$ is specified in the address part 13, the decoder signal on the line "$R_1$" also activates the switch circuit 19 through the OR circuit 23 so that the TOS is connected to the main bus 3, but since the line "$R_1$" is not connected to the controller 21, the contents of the stack pointer 9 are not changed, i.e., the disconnect mode is selected. Thus, according to the embodiment of FIG. 5, mode selection is performed by specifying the address of the element $R_0$ or $R_1$ in the address part 13. For instance, consider a MOVE instruction such as:

MOVE $R_0$, $R_3$.

This instruction means that the data stored in the TOS of the stack 7 is popped up in the connected mode and then the popped up data is transferred to the element $R_3$ in the general purpose register file 5. Consider now another MOVE instruction such as:

MOVE $R_1$, $R_3$.

This instruction means that the data stored in the TOS is read out in a nondestructive mode and then the read out data is transferred to the element $R_3$ in the register file 5.

FIG. 6 is a table showing the addressing for the system of FIG. 5. In FIG. 6, the value of bit 3 in the address part determines whether the general purpose register (or the stack) or the main memory is to be accessed and FIG. 6 only shows the case when the value of bit 3 is "0", as is the case in FIG. 2. The value "000" of bits 2 through 0 in the address part 13 specifies the element TOS ($R_0$) in the connect mode. The value "001" of bits 2 through 0 specifies the element TOS ($R_1$) in the disconnect mode. For the other values "010" through "111", the selected elements are $R_2$ through $R_7$, respectively, as is the case in FIG. 2.

Although the elements $R_0$ and $R_1$ have been made to correspond to the TOS in the connect mode and the TOS in the disconnect mode, respectively, in FIG. 5, it is to be understood that other elements may be made to correspond to the TOS.

The operation of the system of FIG. 5 is similar to that of FIG. 1 and thus apparent to those skilled in the art. Therefore, a detailed description of the operation of the system of FIG. 5 is omitted.

FIG. 7 illustrates a block diagram of a data processing system according to still another embodiment of the present invention. In FIG. 7, a current stack indicator (CSI) 25 which is an alternative to the mode designating part 15 in FIG. 1, is employed to store a flag for specifying the connect mode or the disconnect mode and an address for specifying one element as the TOS of the stack. The output of the CSI 25 is connected to the input of the second decoder 27 which decodes the digit code from the CSI 25. Responding to the decoded output signal from the decoder 27, a multiplexer 29 connects one of the elements $R_0$ through $R_7$ with the TOS of the stack 7. The multiplexer exchanges data between the TOS and the specified element so that the contents of the TOS are coincident with the contents of the specified element. The controller 21 controls the operation of the stack pointer 9 in response to the output signal from the decoder 27. The other reference numerals used in FIG. 7 are the same as those used in FIG. 1 and FIG. 5.

The rectangle shown in the upper portion of FIG. 8 is a table showing the constitution of the current stack indicator 25. As shown in the rectangle, the CSI stores four bits, i.e., bits 3 through 0. When the value of bit 3 is "0", the connect mode is specified and when the value of the bit 3 is "1", disconnect mode is specified. The value of bits 2 through 0 in the CSI specifies one of the elements in the general purpose register file to be connected to the TOS of the stack. This mode selection and element designation will be more clearly understood from the lower rectangle in FIG. 8 which is a table showing assignment of the TOS using the CSI. As can be seen in the table, when the bit 3 is "0", the connect mode is selected and when bit 3 is "1", the disconnect mode is selected. The element in the register to be connected to the TOS is designated in accordance with the value of bits 2 through 0. Thus, for example, when the contents of the CSI 25 are "0100", the element $R_4$ is designated to be connected to the TOS in the connect mode and when the contents of the CSI are "1010", the element $R_2$ is designated to be connected to the TOS in the disconnect mode. If the contents specified in the address part 13 (FIG. 7) are the same as the contents of the bits 2 through 0 in the CSI 25, the TOS of the stack to which the specified element is connected through the multiplexer 29, is accessed.

If necessary, the contents of the CSI 25 in FIG. 7 may be changed during the operation of the system of FIG. 7. The advantages of having the CSI 25 by which any element can be connected to the TOS of the stack are as follows:

(1) A high activity ratio for the general purpose register can be obtained. This is because the element to be made to correspond to the TOS is not fixed and may be freely changed during the operation of the system.
  (a) When a system uses some elements for special purposes, and alternative elements cannot be used as the special purpose elements, any element except for the special purpose elements can be specified to correspond to the TOS, by using the CSI.
  (b) When double-precision arithmetic or quadru-precision arithmetic is required to be performed in the general purpose register and two or four successive elements are used in these operations, any element except for these successive elements can be specified to correspond to the TOS by using the CSI.

(2) A wide range of flexibility in emulating other computers or virtual machines can be obtained. That is, any stack or register machine can be readily emulated by using the CSI 25 of FIG. 7.

FIG. 9 illustrates a block diagram of a data processing system according to still another embodiment of the present invention, in which two current stack indicators CSI (1) 31 and CSI (2) 39 are provided in place of the CSI 25 in FIG. 7. Each of the CSI (1) and CSI (2) stores three digits for specifying the element of the register file 5 to be connected to the TOS and the content of these CSIs can also be changed during the operation of the system of FIG. 9. The CSI (1) 31 is connected through a decoder 33 to a multiplexer (1) 35 and the CSI (2) 39 is connected through a decoder 41 to a multiplexer (2) 37. When the contents specified in the address part 13 are the same as the contents in the CSI (1) 31, the TOS of the stack to which the specified element of the general purpose register file 5 is connected through the multiplexer 35, is accessed, and the TOS acts in a disconnect mode. The output of the decoder 41 is also connected to the controller 21 for controlling the operation of the stack pointer 9. Therefore, when an address specified in the address part 13 is the same as the digit code in the CSI (2) 39, the TOS of the stack to which the specified element of the general purpose register file 5 is connected through the multiplexer 37, is accessed, and the TOS acts in a connect mode.

FIG. 10 is a table showing the relationship between the contents of the CSI (1) and CSI (2) and the element in the general purpose register which is to be connected to the TOS in the connect mode or the disconnect mode. In the FIG. 10, the TOS in the connect mode is represented by "↑ ↓ TOS" and the TOS in the disconnect mode is represented by "TOS". In FIG. 10, the CSI (1) and CSI (2) both include three bits, namely bits 2 through 0, and the contents of the CSI (1) are different from the contents of the CSI (2). Therefore, if the contents of the CSI (1) are "000", the possible contents of the CSI (2) are any one of the codes "001" through "111". Also, if the contents of the CSI (1) are "001", the possible contents of the CSI (2) are any one of the codes "000" through "111" except for the code "001". Thus, the two elements in the general purpose register file 5, which are specified by the CSI (1) and CSI (2), are connected through multiplexers (1) and (2) respectively to the TOS of the stack. For instance, consider the case where the contents of the CSI (1) are "000" and the contents of the CSI (2) are "001". In this case, when a code "000" is specified in the address part 13, the TOS to which the element $R_0$ is connected in the disconnect mode will be accessed and therefore, the TOS is used simply as an element of the general purpose register file. When an address "001" is specified in the address part 13, the TOS to which the element $R_1$ is connected in the connect mode will be accessed and in this case, the contents of the stack pointer 9 will be changed so that the TOS acts as a stack.

Although the number of elements of the general purpose register file has been limited to eight in the foregoing description of four embodiments, it is not necessary to limit the number of eight and any number of elements may be used in the present invention.

Although preferred embodiments of the invention have been described in detail, it is to be understood that various changes, substitutions and alterations can be made therein without departing from the spirit and scope of the invention as defined by the appended claims.

From the foregoing description, it will be understood that, according to the present invention, a data processing system, having three resources and capable of providing high throughput, reducing the number of instructions and employing a two-address format instruction, can be provided.

What is claimed is:

1. A data processing system for performing operations on data, comprising:
   a memory;
   a general purpose register file, having a plurality of elements, operatively connected to said memory;
   a stack, having a top, operatively connected to said memory;
   an instruction register, operatively connected to said general purpose register file and said stack, for storing first and second operand specifiers, each of which includes an address part, for specifying an address of each of the data, and an operation code for designating an operation to be performed;
   first means, operatively connected to said stack and said instruction register, for causing said top of the stack to correspond to at least one of said elements in the general purpose register file; and
   second means, operatively connected to said stack and said instruction register, for controlling the operation of said stack, so that when said element, to which said top of the stack corresponds, is specified by each of said address parts, said top of the stack is selected by said first means and the operation of said stack is controlled by said second means.

2. A data processing system as set forth in claim 1, wherein said second means comprises a stack pointer operatively connected to said top of the stack, and means for selectively changing the contents of said stack pointer, said stack pointer controlled to point said top of the stack by selectively changing the contents of said stack pointer.

3. A data processing system as set forth in claim 2, wherein said instruction register has a mode designating flag operatively connected to said stack pointer, for indicating whether the contents of said stack pointer is to be changed.

4. A data processing system as set forth in claim 2, wherein said first means causes said top of the stack to correspond to two of said elements and wherein said second means causes the contents of said stack pointer to selectively change when one of said two elements is specified by either of said address parts, respectively.

5. A data processing system as set forth in claim 2, wherein said first means comprises a current stack indicator operatively connected to said second means, said current stack indicator having a mode designating flag for indicating whether the contents of said stack pointer is to be changed, and said current stack indicator having an element specifying part for specifying one of said elements in said general purpose register file and for causing said one of the elements to correspond to said top of the stack.

6. A data processing system as set forth in claim 5 further comprising a multiplexer/demultiplexer for selectively connecting said specified one of the elements of said general purpose register file to said top of the stack in dependence upon the contents of said current stack indicator.

7. A data processing system as set forth in claim 2, wherein said first means comprises a first current stack indicator operatively connected to said stack and a second current stack indicator operatively connected to said stack, each of said first and second current stack indicators having an element specifying part for specifying one of said elements in the general purpose register file and for connecting said one of the elements to said top of the stack, and wherein the contents of said stack pointer are changed when said address part specifies one element which is specified by said element specifying part in said first current stack indicator, and the contents of said stack pointer are not changed when said address part specifies the other element which is specified by said element specifying part in said second current stack indicator.

* * * * *

UNITED STATES PATENT AND TRADEMARK OFFICE
CERTIFICATE OF CORRECTION

PATENT NO. : 4,334,269
DATED : JUNE 8, 1982
INVENTOR(S) : SHIBASAKI ET AL.

It is certified that error appears in the above—identified patent and that said Letters Patent is hereby corrected as shown below:

```
Col. 1, line 18, "perfomes" should be --performs--.
Col. 3, line 55, "addition" should be --addition,--;
        line 58, "set an" should be --set,--.
Col. 5, line 27, "(RO) R0" should be --(R0)--.
Col. 6, line 20, after "subtraction" insert --,--.
Col. 7, line 46, after "obtained;" insert --and--;
        line 58, delete "a".
Col. 8, line 15, "decoder" should be --decoded--.
Col. 9, line 41, "25" should be --25,--;
        line 42, "stack" should be --stack,--.
```

Signed and Sealed this

Nineteenth Day of October 1982

[SEAL]

Attest:

Attesting Officer

GERALD J. MOSSINGHOFF

Commissioner of Patents and Trademarks